Aug. 30, 1966  A. C. S. VAN HEEL ETAL  3,269,253
PERISCOPE SEXTANT
Filed Sept. 26, 1956
4 Sheets-Sheet 1
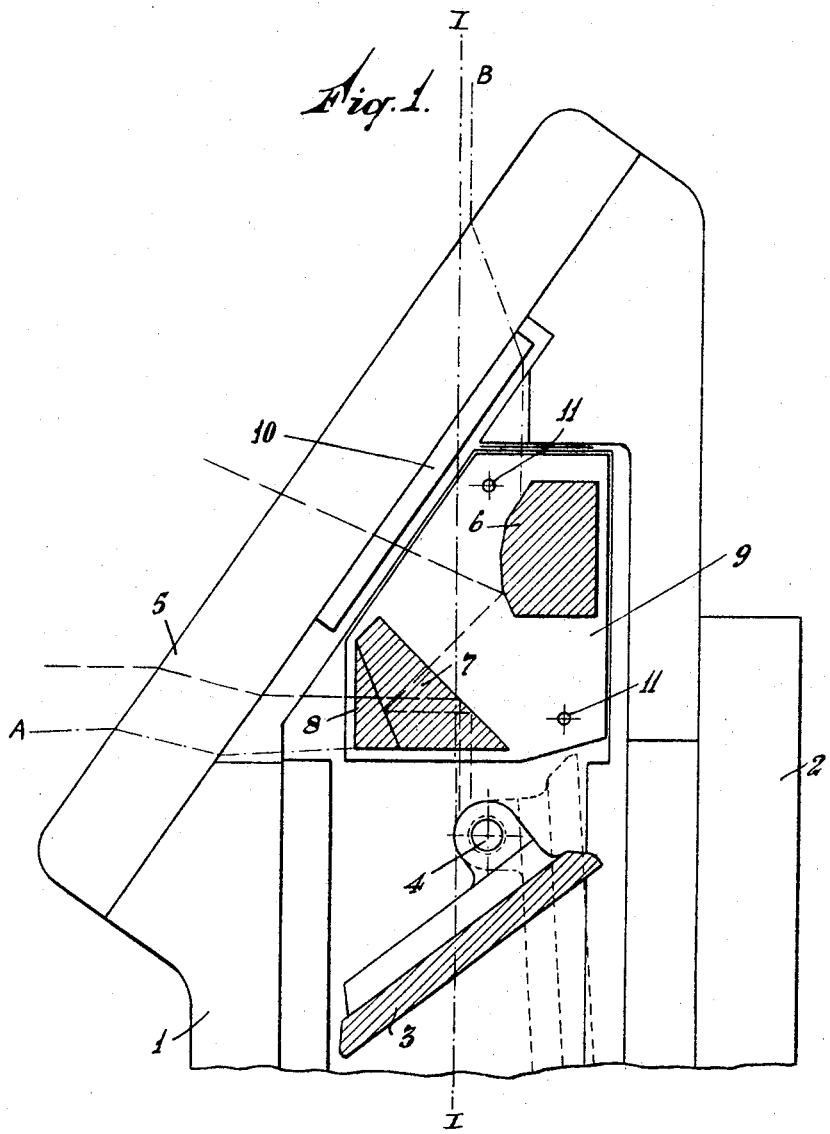
INVENTORS
ABRAHAM C. S. VAN HEEL
GERARDUS J. BEERNINK
JAN G. DOEKES
HENDRIK J. RATERINK

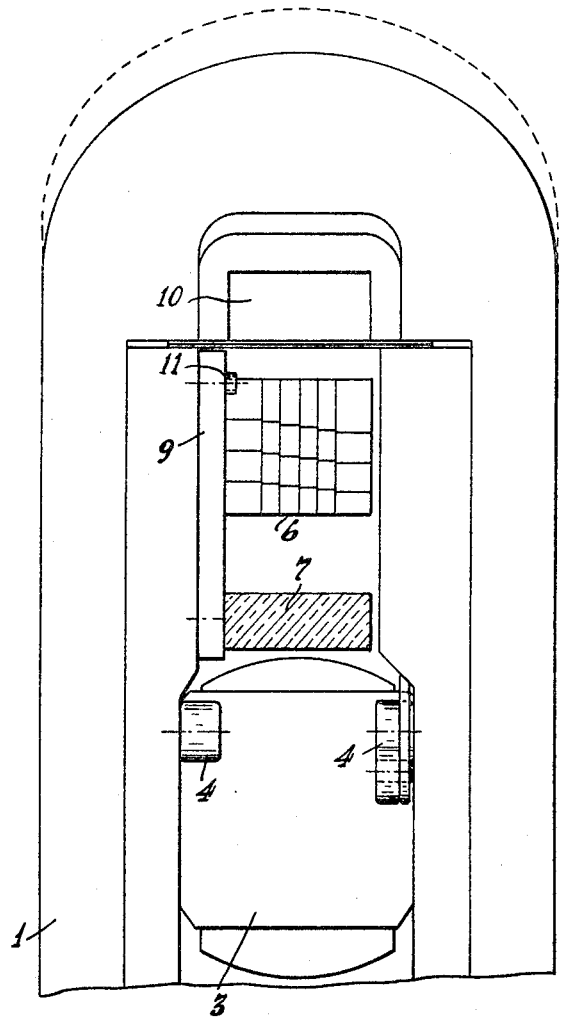

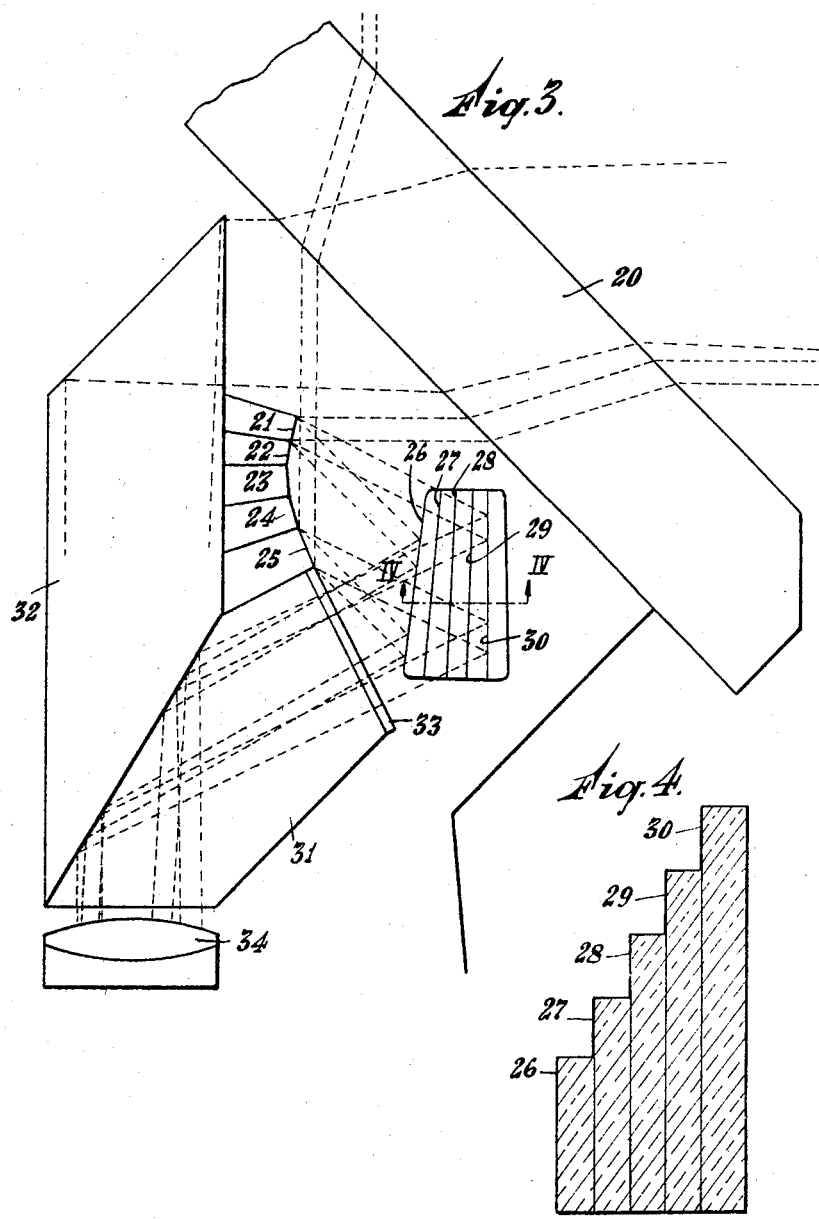

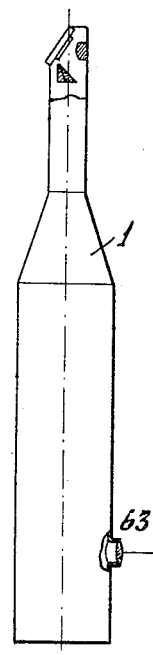
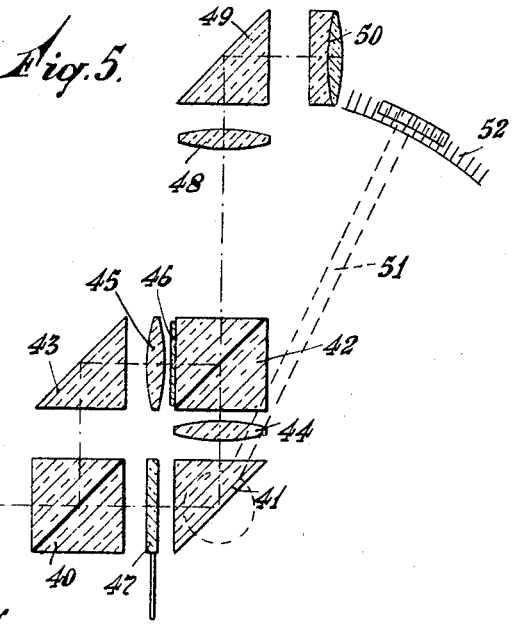
Fig. 5.
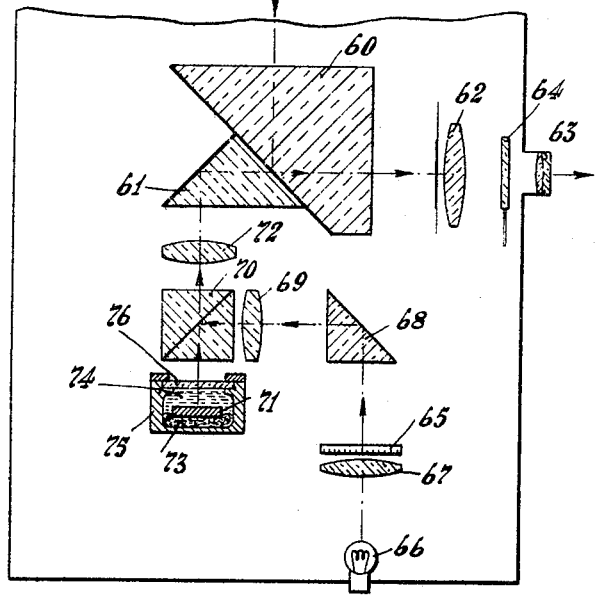
Fig. 6.
INVENTORS
ABRAHAM C.S. VAN HEEL
GERARDUS J. BEERNINK
JAN G. DOEKES
HENDRIK J. RATERINK
BY
ATTORNEYS United States Patent Office 3,269,253
Patented August 30, 1966

3,269,253
PERISCOPE SEXTANT
Abraham C. S. van Heel, Delft, Gerardus J. Beernink, The Hague, and Jan G. Doekes and Hendrik J. Raterink, Delft, Netherlands, assignors to The Nederlandse Organisatie voor Toegepast-Natuurwetenschappelijk Onderzoek ten Behoeve van de Rijksverdediging (The National Defence Research Council T.N.O.), The Hague, Netherlands, a corporation of the Netherlands
Filed Sept. 26, 1956, Ser. No. 612,331
Claims priority, application Netherlands, Oct. 3, 1955, 200,913
10 Claims. (Cl. 88—2.3)

The invention relates to a periscope sextant in particular for use in submarine periscopes.

Up to now it has not yet been possible to carry out the "shooting" of the sun or a star via the periscope of a submarine in a sufficiently rapid and accurate manner. Periscope sextants for use in aircrafts are known in the art. These operate with a pivotable mirror in the top of the periscope which mirror is adjusted and controlled at the bottom of the periscope. However, in submarine periscopes which have nowadays a tube length of some 10 to 12 metres the adjusting of such a mirror cannot be done with sufficient accuracy and reproducibility.

An object of the invention is to provide a periscope sextant for use in submarines with which any celestial body may be shot in some 30 to 60 seconds with sufficient accuracy.

A further object of the invention is to provide a nonpivotable optical system for the top of a periscope and for a separate optical system for the bottom of the periscope for determining the angle to be measured there.

Further objects of the invention will be apparent from the specification below.

The device according to the invention comprises a nonpivotable mirror system which splits up the light of the total range between the horizon and the zenith in the direction of the bearing into 10 to 30 parts of circa 3 to 9 degrees each, the angle of light reflected from each facet of said mirror overlapping those of adjacent facets slightly, all of the light from said parts or facets being transmitted to the bottom of the periscope tube so that when at the eyepiece side of the periscope a real image of the said mirror system is formed, said image is composed of the said 10 to 30 parts of light situated in a number of 3 to 6 adjacent rows, each row being composed of a few of said parts of light, means being provided at the bottom of the periscope tube to measure the angle observable there between the image of the horizon and the image of the body observed which, when added to the known angle of the facet of the mirror system gives the total angle between the horizon and the body observed.

The invention will be illustrated by way of example by means of some embodiments shown in the drawing of which FIG. 1 shows a vertical partial cross-section over the upper part of a periscope containing an embodiment of the invention, FIG. 2 is a front view and partial cross-section along the line I—I of FIG 1, FIG. 3 is a partial schematical view of another embodiment of the invention for the upper part of the periscope, FIG. 4 is a cross-section along the line IV—IV of FIG. 3 on an enlarged scale, FIG. 5 is a cross-section of an embodiment of the means to measure the angle at the bottom of the periscope tube, and FIG. 6 is a cross-section of another embodiment of said measuring device.

FIG. 1 shows the upper part of a periscope tube 1 having the usual viewing window 2 and a pivotable mirror 3 for making observations, which mirror can be pivoted around the axis 4 into the position indicated with the dotted lines in order to prepare the periscope for the shooting of a celestial body or for the measuring of any other angular altitude. For that purpose another viewing window 5 is mounted and also a non-pivotable mirror system 6 is provided having 24 reflecting surfaces, or facets composed of 6 units as shown in FIG. 2, which units are piled up so as to obtain an even distribution of the 24 reflecting surfaces over the entire range of between 0° and circa 90°. In FIG 1, dotted lines A and B represent the widest angle of light possible to observe by the periscope.

In the embodiment shown in FIG. 2 the angle between two adjacent reflecting surfaces of each unit of body 6 is circa 11.5° the units being piled up such that the angle between the first reflecting surfaces of two adjacent units is circa 1°55′.

Body 6 together with the mixing prisms 7, 8 is mounted on a plate 9 which is fixed in the periscope tube with a pair of bolts 11. Part of the inward surface of window 5 is covered by a Polaroid 10. In shooting e.g. the sun, a beam of light of the sun falls on the mirror system 6 and is reflected by one of the 24 reflecting surfaces to the prism 7 in a direction substantially perpendicular to the surface thereof. After two reflections in said prism 7 the beam is transmitted to the bottom of the periscope tube. The beam of the horizon enters through the lower part of window 5, beneath the Polaroid 10 passes the prism 8 and is reflected by prism 7 to the bottom of the periscope tube. When in this specification the horizon is mentioned, this term is meant to designate the part of the horizon observed in the direction of bearing.

The Polaroid 10 serves to enable the observer to reduce the amount of light of the sun in co-operation with a pivotable Polaroid mounted somewhere in the lower part of the periscope.

In the arrangement shown the beam of light of the sun and that of the horizon both undergo an even number of reflections. As is generally known in this field, the difference in reflections between both beams should be even or zero.

At the lower part of the periscope a real image of the mirror system can be observed through the eyepiece which is of the same type as the view of body 6 shown in FIG 2 composed of 6 rows of 4 parts each.

With this embodiment of the mirror system the total height to be measured e. g. from 0 to 90° is subdivided into a great many parts, 24 parts according to the drawings, each part measuring circa 4°, the adjacent parts overlapping each other slightly. This overlapping is controlled by means of the appropriate form and dimensions of prism 7 as is known in the art.

The maximum angle to be measured at the bottom of the periscope tube depends on the magnification of the periscope optics. In order to be able to calculate the total angle one wants to know via which particular mirror the light has been reflected. By adjusting the eyepiece of the periscope it is possible to produce at the eye side of the eyepiece a real image of the entire mirror system, so that it may be noted which of the mirrors is reflecting the body to be shot. The identification of that mirror is facilitated by means of a transparent plate, which can be placed over the said real image of the mirror system on the eye side of the eyepiece and which bears identification numbers which correspond to the various mirrors, which numbers are conveniently observed with a magnifying glass.

FIG. 3 shows a different embodiment of a non-pivotable mirror system with an observation window 20 corresponding to window 5 in FIG. 1 and a first set of oblong reflecting surfaces 21, 22, 23, 24 and 25. One of said reflecting surfaces reflects the beam of light to a second set of oblong reflecting surfaces 26, 27, 28, 29 and 30 composed of 5 wedge-like glass-plates piled up stepwise as shown in FIG. 4.

The range reflected by each of the mirrors of the first set of mirrors is split up in 5 sub-ranges by the second set of mirrors so that the entire range between circa 0 and circa 90° is divided into 25 equal parts. To obtain this result the angles between the mirrors of the first set are circa 9° and between those of the second set circa 1.8°.

In FIG. 3 a polaroid 33 is mounted on the prism 31. Prism 32 reflects the beam of light of the horizon and transmits it to the lower part of the periscope via part of prism 31 and via an object lens 34. On the eye side of the eyepiece at the lower part of the periscope a real image of the combined sets of mirrors can be made, which looks similar to that type shown at 6 in FIG. 2 but now consists of 5 rows of 5 parts each. By coinciding with the said real image of the mirror system a similar transparent plate as described above, provided with identification numbers, it is again possible to determine which amount has to be added to the angle measured in order to know the angular altitude of the object shot.

Likewise, it is possible to make a combination of e.g. 5×6, 4×5, 4×4 or even 4×3 reflecting surfaces in a manner corresponding to either of the two embodiments described.

The less the total number of mirror surfaces the cheaper the mirror system is, but the greater the angle to be measured in the lower part of the periscope tube. However, said angle restricts the minimum number of parts possible, depending on the magnification of the periscope optics. The greater the total number of mirror surfaces, the more expensive is the mirror system and the more difficult is the identification of the particular mirror. For practical purposes a division into some 20 to 30 parts suffices, 24 to 25 being the preferred amount.

FIG. 5 shows schematically the lower part of the periscope tube. The light leaving the periscope tube sidewards through the eyepiece—as usual with periscopes—and being composed of both the beams of the sun—or other celestial body to be shot—and of the horizon and shown within the limited angular field of view of the periscope is split up into two divisional beams in the beam splitting prism 40 having a diagonal plane which partly passes and partly reflects the light. The beam passing in the original direction is reflected by the pivotable measuring prism 41 to a mixing prism 42 which is similar to prism 40. The divisional beam reflected in prism 40 is led to mixing prism 42 by a reflecting prism 43. Said divisional beams pass on their path to prism 42 a lens 44 or 45 respectively. One of said divisional beams passes also a pivotable Polaroid 47, serving to controllably reduce the amount of light of the sun.

The other of said divisional beams passes a Polaroid 46 standing in crossed position with regard to the Polaroid in the upper part of the periscope, thus extinguishing the light of the sun, leaving only the light of the horizon in this divisional beam.

The light coming from the prism 42 passes a lens 48 and a reflecting prism 49, the image formed being observed through eyepiece 50. The measuring prism 41 is mounted on a pivotable arm 51 which can be pivoted along a graduation 52 (as usual in a sextant).

By pivoting arm 51 the image of the sun and that of the horizon observable through the eyepiece can be made to coincide as in a known sextant; the small angle measured can be read off on the graduation. To this is then added the known angle of the particular facet of the mirror reflecting the body to obtain the total angle between the horizon and the sun. The relatively minor swinging of the submarine below the sea surface exerts substantially no influence on this reading as the image of the sun and the horizon show the same swinging.

Instead of Polaroid one obviously may also use complementary filters.

FIG. 6 shows the bottom part of a periscope with prism 60, lens 62 and eyepiece 63. A pivotable Polaroid has been mounted between 62 and 63. On the partial reflecting behind wall of prism 60 a prism 61 is fitted. A graduated scale 65 is enlightened by an electric bulb 66 via a lens 67. This bulb is advantageously fed by a dry battery (not shown in the drawings) which battery is positioned in a casing in the bottom of the periscope so that it may be renewed. The light of the graduated scale 65 is transmitted via prism 68, lens 69, double prism 70, floating mirror 71, which forms part of an artificial horizon, again double prism 70, lens 72, mixing prism 61/60 to the eyepiece 63. The lenses being adjusted such that the graduated scale and the object to be shot and the horizon can all be viewed sharply in the same plane.

Preferably the artificial horizon is composed of a mirror floating on the interface of two liquids 73 and 74 in a closed vessel 75 the upper side of which is a plan-parallel glass plate, but other embodiments of an artificial horizon can also be used.

By appropriately choosing the lenses and the various dimensions it is possible to obtain that, viewed through eyepiece 63, the image of the scale 65 shows the same swinging as the image of the object to be shot and (if provided for) of the real horizon.

The centering of mirror 71 is advantageously obtained by means of an iron ball, fixed to the underside of the mirror, co-operating with a magnet 75 adjusted to the underside of vessel 75.

The embodiments of FIG. 5 and FIG. 6 may be combined so that it is possible to measure either relative to the artificial or relative to the real horizon or to check the artificial horizon relative to the real horizon.

Furthermore, the usual filters and/or polaroids may be mounted in order to be able to reduce the amount of light of the object to be shot.

It will be clear that many variations may be made without departing from the scope of the invention.

What we claim is:

1. A periscope sextant comprising a periscope tube having a viewing window in the upper part of said periscope tube and an eyepiece in the lower part of said periscope tube, a stationary mirror system in the upper part of said periscope tube, means in said mirror system to divide the light of the total range between the horizon and the zenith in the direction of the bearing into 10 to 30 parts of light of about 3 to 9 degrees each, said parts of light overlapping each other slightly, said mirror system reflecting all of said parts of light of the total range between the horizon and the zenith in the direction of the bearing, means to transmit said reflected parts of light along with the light from the horizon to the bottom of said periscope tube through conventional prisms and lenses in such a manner that when a real image of the said mirror system is formed at the eye side of the eyepiece of said periscope said image is composed of the said 10 to 30 parts of light situated in a number of 3 to 6 adjacent rows, each row being composed of a few of said parts of light, and the horizon, and means to measure the angle to be observed between said parts of light and the horizon.

2. A periscope sextant comprising a periscope tube having a viewing window in the upper part of said periscope tube and an eyepiece in the lower part of said periscope tube, a stationary mirror system in the upper part of said periscope tube, comprising 3 to 6 units which units each consist of a plan-parallel plate, one of its side walls being composed of 3 to 6 reflecting surfaces which are positioned perpendicular to the plan-parallel sides and which make an angle with each other and occupy the total thickness of said plate; said plates being piled up and positioned mutually such that no two reflecting surfaces are parallel and the angle existing between the two utmost reflecting surfaces being about 45°, said mirror system dividing the light of the total range between the horizon and the zenith in the direction of the bearing into 10 to 30 parts of light of about 3 to 9 degrees each, said parts of light overlapping each other slightly, said mirror system reflecting all of said parts of light of the total range between the horizon and the zenith in the direction of the bearing, means to transmit said reflected parts of light along with the light from the horizon to the bottom of said periscope tube through conventional prisms and lenses in such a manner that when a real image of the said mirror system is formed at the eye side of the eyepiece of said periscope said image is composed of the said 10 to 30 parts of light situated in a number of 3 to 6 adjacent rows, each row being composed of a few of said parts of light, and the horizon, and means to measure the angle to be observed between said parts of light and the horizon.

3. A periscope sextant comprising a periscope tube having a viewing window in the upper part of said periscope tube and an eyepiece in the lower part of said periscope tube, a stationary mirror system in the upper part of said periscope tube, comprising a first set of 3 to 6 oblong reflecting surfaces, positioned with their greatest length parallel to a common axis, each of them reflecting a part of the total angular altitude to be measured to a second set of oblong reflecting surfaces which are positioned with their greatest length perpendicular to the said common axis of the first set of oblong reflecting surfaces and with their reflecting surfaces parallel to said axis and which also make angles mutually such that the total angle reflected by each reflecting surface of the first set of reflecting surfaces is again subdivided into a number of parts by means of the second set of reflecting surfaces, said mirror system dividing the light of the total range between the horizon and the zenith in the direction of the bearing into 10 to 30 parts of light of about 3 to 9 degrees each, said parts of light overlapping each other slightly, said mirror system reflecting all of said parts of light of the total range between the horizon and the zenith in the direction of the bearing, means to transmit said reflected parts of light along with the light from the horizon to the bottom of said periscope tube through conventional prisms and lenses in such a manner that when a real image of the said mirror system is formed at the eye side of the eyepiece of said periscope said image is composed of the said 10 to 30 parts of light situated in a number of 3 to 6 adjacent rows, each row being composed of a few of said parts of light, and the horizon, and means to measure the angle to be observed between said parts of light and the horizon.

4. A periscope sextant comprising a periscope tube having a viewing window in the upper part of said periscope tube and an eyepiece in the lower part of said periscope tube, a stationary mirror system in the upper part of said periscope tube, means in said mirror system to divide the light of the total range between the horizon and the zenith in the direction of the bearing into 10 to 30 parts of light of about 3 to 9 degrees each, said parts of light overlapping each other slightly, said mirror system reflecting all of said parts of light of the total range between the horizon and the zenith in the direction of the bearing, means to transmit said reflected parts of light along with the light from the horizon to the bottom of said periscope tube through conventional prisms and lenses in such a manner that when a real image of the said mirror system is formed at the eye side of the eyepiece of said periscope said image is composed of the said 10 to 30 parts of light situated in a number of 3 to 6 adjacent rows, each row being composed of a few of said parts of light, and the horizon, and means to measure the angle to be observed between said parts of light and the horizon, said means comprising a pivotable reflecting surface mounted on a pivotable measuring arm gliding along a graduated scale, a beam splitting prism which partially reflects and partially transmits the beams of light of the horizon and of the object to be shot, a filter, positioned in one of the paths of light of the said beam splitting prism, co-operating with another filter positioned in the upper part of said periscope tube in the path of the beam of the light of the object to be shot, but not in the path of the light of the horizon, to extinguish the light of the object to be shot in one of said two beams coming from the beam splitting prism and a mixing prism for remixing the last-mentioned two beams.

5. A periscope sextant as claimed in claim 2 wherein the said units have an identical cross-section in a direction parallel to the plan-parallel sides, the angles between the said reflecting surfaces in each unit being substantially equal mutually, the units being positioned such with respect to an axis parallel to all reflecting surfaces that the angles between the first reflecting surface of each unit and the first reflecting surface of the adjacent unit are likewise substantially equal mutually.

6. A periscope sextant as claimed in claim 5 wherein each unit comprises 4 reflecting surfaces, the angles between two adjacent ones amounting to substantially 11.5° and wherein the angles between the first reflecting surface of each unit and the first reflecting surface of the adjacent unit amount to substantially 1°55′.

7. A periscope sextant as claimed in claim 3, wherein the angles between each two adjacent reflecting surfaces of said first set are mutually substantially equal and also substantially equal to the angle between the most distant reflecting surfaces of the second set of reflecting surfaces, the angles between each two adjacent reflecting surfaces of said second set being likewise mutually substantially equal.

8. A periscope sextant as claimed in claim 7, wherein the second set of mirrors consists of a number of wedge-shaped plates piled up step-wise with their thinnest sides pointing to the same direction, the height of the steps being formed by their wedge-shaped sides.

9. A periscope sextant as claimed in claim 8 wherein each of both sets consists of five reflecting surfaces.

10. A periscope sextant as claimed in claim 1 wherein a scale graduation is projected in the same plane as the image of the object to be shot with the aid of a light source and via an artificial horizon containing a floating mirror.

References Cited by the Examiner

UNITED STATES PATENTS

| | | | |
|---|---|---|---|
| 1,006,230 | 10/1911 | Killmorgen | 88—72 |
| 1,937,378 | 11/1933 | Alexanderson | 88—16.8 X |
| 2,384,209 | 9/1945 | Sukumlyn | 88—14 |
| 2,408,495 | 10/1946 | Wager | 88—68 |
| 2,505,819 | 5/1950 | Wrigley | 88—72 |
| 2,534,543 | 12/1950 | Bullock | 88—84 |
| 2,579,903 | 12/1951 | Carbonara | 88—2.7 |
| 2,758,500 | 8/1956 | Eckweiler | 88—2.3 |
| 2,819,404 | 1/1958 | Herrnring | 88—85 |

FOREIGN PATENTS 338,386    5/1904    France.

JEWELL H. PEDERSEN, *Primary Examiner.*

SAMUEL BOYD, SAMUEL FEINBERG, *Examiners.*

D. D. DOTY, O. B. CHEW, *Assistant Examiners.*